United States Patent [19]

Oshima

[11] Patent Number: 5,225,728
[45] Date of Patent: Jul. 6, 1993

[54] NON-CONTACT-GUIDABLE MAGNETIC FLOATING DEVICE

[75] Inventor: Shintaro Oshima, Shino, Japan

[73] Assignees: Shibasoku Co., Ltd.; Asaka Corporation, both of Tokyo, Japan

[21] Appl. No.: 664,539

[22] Filed: Mar. 4, 1991

[30] Foreign Application Priority Data

Mar. 19, 1990 [JP] Japan .................... 2-67294

[51] Int. Cl.$^5$ .............................. H02K 7/09
[52] U.S. Cl. .................... 310/90.5; 335/306; 335/296
[58] Field of Search ............ 335/296, 302, 306, 207; 104/281, 283; 310/90.5

[56] References Cited

U.S. PATENT DOCUMENTS 3,791,309 2/1974 Baermann ............ 335/306
4,054,944 10/1977 Lau ..................... 335/207

FOREIGN PATENT DOCUMENTS

2515181 4/1976 Fed. Rep. of Germany ...... 104/283

Primary Examiner—Leo P. Picard
Assistant Examiner—Raymond Barrera
Attorney, Agent, or Firm—Emmanuel J. Lobato; Robert E. Burns

[57] ABSTRACT

A simple-structured non-contact-guidable magnetic floating device which has stable restoring forces in vertical and horizontal directions perpendicular to the direction of guiding the moving member. At least one inner magnetic member is formed so that magnetic poles are continuously arranged lengthwise thereof. Two outer magnetic members are disposed on both sides of the inner magnetic member in adjacent but spaced relation thereto and formed so that magnetic poles are continuously arranged in a lengthwise thereof. A non-magnetic coupling member is provided apart from the inner magnetic member, for coupling together the two outer magnetic members. A support is provided for supporting and fixing one of the inner and outer magnetic members. The other of the inner and outer magnetic members is held in a floating state in which it has restoring forces to its center positions in vertical and horizontal directions, by magnetic attractive forces between the inner and outer magnetic members or a combination of their magnetic attractive and repulsive forces, and the other magnetic member can be guided lengthwise thereof in the floating state.

5 Claims, 9 Drawing Sheets

NON-CONTACT-GUIDABLE MAGNETIC FLOATING DEVICE

BACKGROUND OF THE INVENTION

The present invention relates to a device for floating a moving member along a predetermined route without making contact therewith.

Heretofore, there has been proposed a device which has a structure like a linear motor (see Japanese Pat. Pub. Disc. No. 49673/86). However, such a prior art example employs a complicated structure in which a number of spaced-apart magnetic poles are arranged for floating and guiding a moving member. Besides, since the stability of the moving member in the vertical direction in its floating state is obtained by magnetic forces of individual magnetic poles therebetween, inner and outer magnetic poles often bear the positional relationship in which they do not exactly face each other, as the moving member is guided, and consequently, the stability of the moving member in the vertical direction is not so high. Moreover, since the moving member cannot be stopped at the position where the inner and outer magnetic poles do not exactly face each other, it is impossible to stop it with high precision at a desired position in its lengthwise direction.

SUMMARY OF THE INVENTION

An object of the present invention is to provide a simple-structured non-contact-guidable magnetic floating device which has stable restoring forces in vertical and horizontal directions perpendicular to the direction of guiding the moving member.

To attain the above-mentioned object, the non-contact-guidable magnetic floating device of the present invention comprises: at least one inner magnetic member formed so that magnetic poles are continuously arranged lengthwise thereof; two outer magnetic members disposed on both sides of the inner magnetic member in adjacent but spaced relation thereto and formed so that magnetic poles are continuously arranged in a lengthwise thereof; a non-magnetic coupling member provided apart from the inner magnetic member, for coupling together the two outer magnetic members; and a support for supporting and fixing one of the inner and outer magnetic members. The other of the inner and outer magnetic members is held in a floating state in which it has restoring forces to its center positions in vertical and horizontal directions, by magnetic attractive forces between the inner and outer magnetic members or a combination of their magnetic attractive and repulsive forces, and the other magnetic member can be guided lengthwise thereof in the floating state.

BRIEF DESCRIPTION OF THE DRAWINGS

The present invention will be described in detail below with reference to accompanying drawings, in which.

DETAILED DESCRIPTION

A description will be given first of the principle of the invention.

Figure 1:
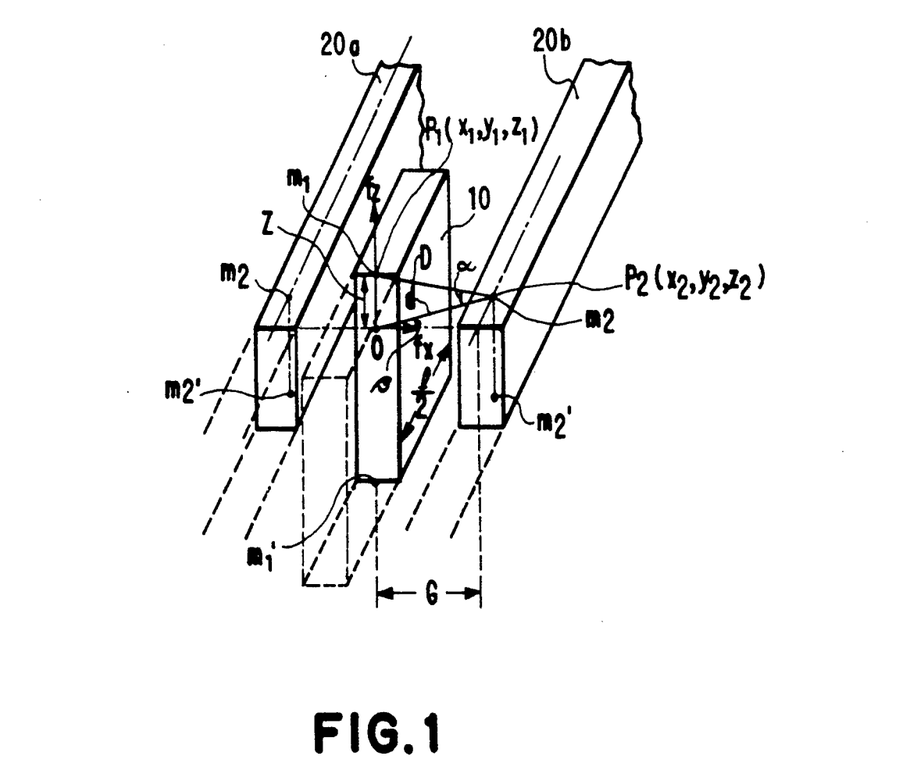
FIG. 1 is a perspective view explanatory of the principle of the present invention.

Now, consider such a structure as shown in FIG. 1, in which a plate-shaped magnetic member 10 is a moving member to be guided lengthwise of plate-shaped magnetic members 20a and 20b disposed on both sides thereof. The magnetic member 10 is formed so that magnetic poles magnetized in the vertical direction perpendicular to the direction of guide are continuously aligned lengthwise thereof. Reference characters $m_1$ and $m_1'$ indicate arbitrary magnetic charges of the magnetic poles. The plate-shaped magnetic members 20a and 20b are each also formed so that magnetic poles magnetized in the vertical direction perpendicular to the direction of guide are continuously aligned lengthwise thereof. Reference characters $m_2$ and $m_2'$ denote arbitrary magnetic charges of the magnetic poles; and Z represents a difference in position in the vertical direction between the magnetic charges $m_1$ and $m_2$ and between the magnetic charges $m_1'$ and $m_2'$. The length of the magnetic member 10 in the direction of guide is represented by l and the origin of the coordinate axis is at the center of the magnetic member 10 (at the position l/2).

An x component $f_x$ of attraction by the magnetic charge $m_1$ at a point $P_1(x_1, y_1, z_1)$ and the magnetic charge $m_2$ at a point $P_2(x_2, y_2, z_2)$ is given by the following equation:

$$f_x = m_1 m_2 \frac{\cos\alpha \cos\beta}{D^2} \tag{1}$$

where:

$$\left. \begin{array}{l} d^2 = (x_2 - x_1)^2 + (y_2 - y_1)^2 \\ D^2 = d^2 + (z_2 - z_1)^2 \\ \cos\alpha = \frac{d}{D} \\ \cos\beta = \frac{x_2 - x_1}{d} \end{array} \right\} \tag{2}$$

Hence, setting $$f_x = m_1 m_2 \frac{x_2 - x_1}{\{(x_2 - x_1)^2 + (y_2 - y_1)^2 + (z_2 - z_1)^2\}^{3/2}} \tag{3}$$

where: $x_2 = G$, $x_1 = \Delta G$, $z_2 = O$, $z_1 = Z$, representing the force in the X direction by a right-hand plate-like magnetic member 20b and the force in the X direction by a left-hand plate-like magnetic member 20a by $f_{xR}$ and $f_{xL}$, respectively, these forces $f_{xR}$ and $f_{xL}$ are given as follows:

$$\left. \begin{array}{l} f_{xR} = m_1 m_2 \dfrac{G - \Delta G}{\{(G - \Delta G)^2 + (y_2 - y_1)^2 + Z^2\}^{3/2}} \\ f_{xL} = m_1 m_2 \dfrac{-(G - \Delta G)}{\{(G - \Delta G)^2 + (y_2 - y_1)^2 + Z^2\}^{3/2}} \end{array} \right\} \tag{4}$$

Letting forces in the right-hand and left-hand directions by the lower magnetic charges $m_1'$ and $m_2'$ be represented by $f_{xR}'$ and $f_{xL}'$, respectively, and if $m_1 = m_1'$ and $m_2 = m_2'$, then $$\left. \begin{array}{l} f_{xR}' = f_{xR} \\ f_{xL}' = f_{xL} \end{array} \right\} \quad (5)$$

Thus, the entire force $f_x$ in the X direction is given by the following equation:

$$\begin{aligned} f_x &= 2(f_{xR} + f_{xL}) \\ &= 2m_1 m_2 \left[ \frac{G - \Delta G}{\{(G - \Delta G)^2 + (y_2 - y_1)^2 + Z^2\}^{3/2}} - \right. \\ &\quad \left. \frac{G - \Delta G}{\{(G + \Delta G)^2 + (y_2 - y_1)^2 + Z^2\}^{3/2}} \right] \end{aligned} \quad (6)$$

Letting a value obtained by integrating this equation from $-\infty$ to $+\infty$ for $y_2$ and from $-1/2$ to $1/2$ for $y_1$ be represented by $F_x$, then $$F_x = \quad (7)$$

$$2m_1 m_2 \int_{-1/2}^{1/2} \int_{-\infty}^{\infty} \left[ \frac{G - \Delta G}{\{(G - \Delta G)^2 + (y_2 - y_1)^2 + Z^2\}^{3/2}} - \frac{G - \Delta G}{\{(G + \Delta G)^2 + (y_2 - y_1)^2 + Z^2\}^{3/2}} \right] dy_2 dy_1$$

Figure 2:
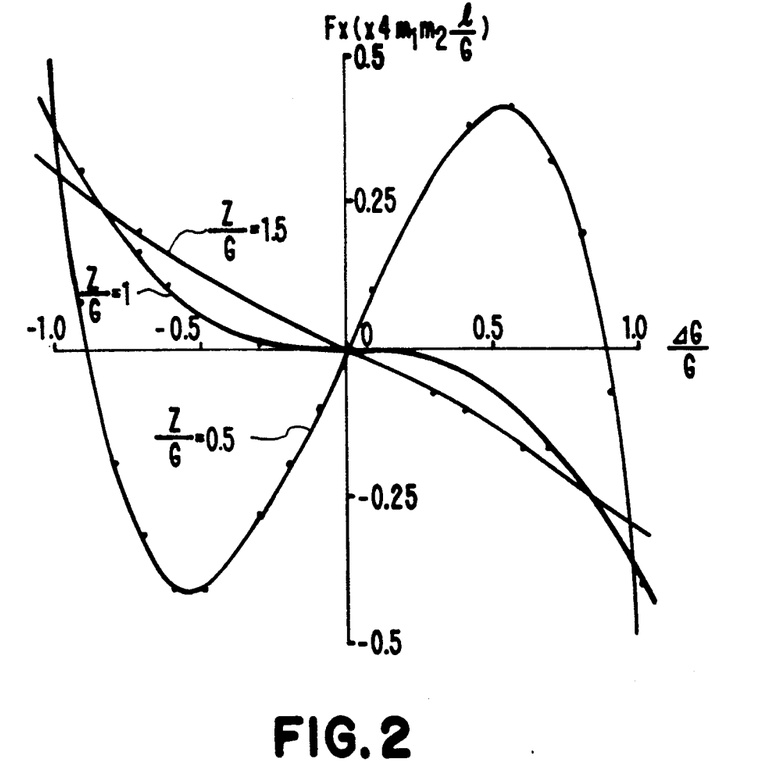
FIGS. 2 and 3 are characteristic diagrams explanatory of the principle of the present invention.

FIG. 2 shows, using Z/G as a parameter, variations in the value $F_x$ when the plate-shaped central magnetic member 10 was moved by $\Delta G$ in both directions perpendicular to the direction of its guide.

In FIG. 1, when a ratio Z/G, of the difference Z in height between the magnetic charges of the central magnetic member 10 and those 20a and 20b on both sides thereof to the gap G therebetween is 0.5, the characteristic $F_x$ in FIG. 2 increases as $\Delta G$ increases, but after a ratio $\Delta G/G$ reaches about 0.55, the value $F_x$ begins to decrease and when the ratio $\Delta G/G$ reaches 0.88 or so, the value $F_x$ becomes zero; namely, no force is applied to either side and the middle magnetic member 10 comes to a standstill. When the magnetic member 10 is further moved to right and the ratio $\Delta G/G$ is increased accordingly, the direction of the force $F_x$ is reversed and the magnetic member 10 is attracted toward the center intermediate between the both side magnetic members 20a and 20b. Thus, when Z/G = 0.5, the vicinity of $\Delta G/G = 0.88$ is a stable point, where the magnetic member 10 stands still. On the other hand, when at the point 0 the magnetic member 10 is moved a little to right, that is, to the positive direction of the ratio $\Delta G/G$, the force $F_x$ toward to right is applied, and consequently, the magnetic member 10 is moved further to right, whereas when the magnetic member 10 is moved in the reverse direction, force is applied to that direction. Hence, the point 0 is an unstable point.

On the other hand, when Z/G = 1 and Z/G = 1.5, the point 0 and the stable point coincide with each other; so that when the central magnetic member 10 is moved to right or left, a force to restore it to its center at all times acts on it. In other words, a restoring force is applied to the magnetic member 10. Consequently, the central magnetic member 10 stays out of contact with the magnetic members 20a and 20b on both sides thereof.

Figure 3:
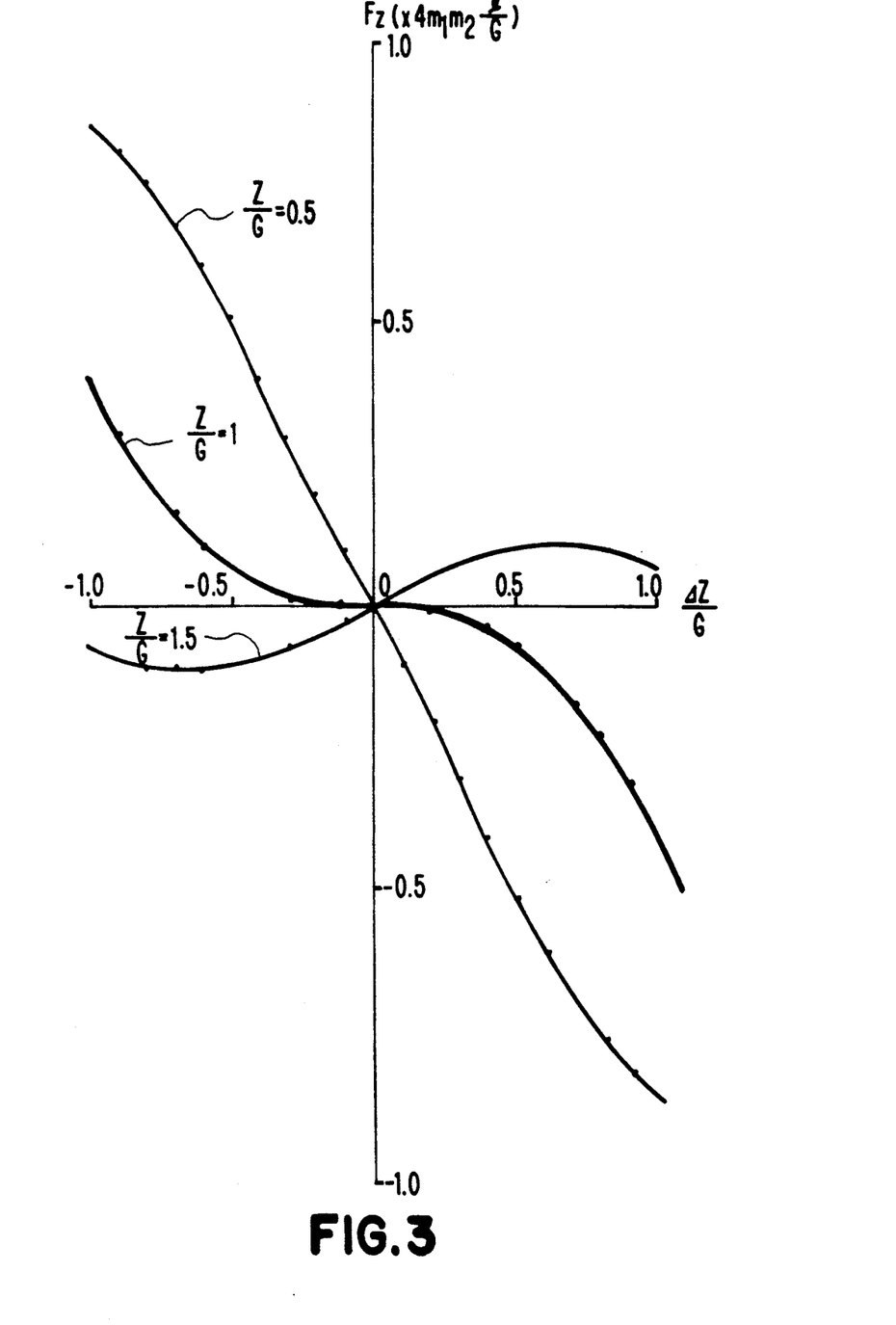

FIG. 3 shows, using the ratio Z/G as a parameter, characteristics of a force $F_z$ in the Z direction for a shift $\Delta Z$ of the central magnetic member 10 in the Z direction. The force $F_z$ is calculated by the same method as Eq. (7). In a case where Z/G = 1.5, there is no stable point between $\Delta G/G = -1$ and $+1$, but in cases where Z/G = 1 and Z/G = 0.5, the zero point is a stable point. Consequently, when the central magnetic member 10 is moved up and down, the force $F_z$ always acts in the direction toward the zero point, and hence a restoring force to the zero point exists and the magnetic member 10 comes to a halt at the center point. If its weight is assumed to be zero, then the magnetic member 10 floats up at the point where Z = 0. Taking its weight into account, the magnetic member 10 floats up at a point where the weight balances with gravity. Thus, FIGS. 2 and 3 demonstrate that the ratio Z/G needs to be 1 for obtaining the restoring force to the zero point in the horizontal and vertical directions.

With Z/G = 1, it is possible to cause the magnetic member 10 to float up in the vicinity of the point Z = 0 in the vertical direction while holding it just intermediate between the both magnetic members 20a and 20b. These calculations are performed regarding each magnetic charge as one point; in practice, they must therefore be corrected through experiments. As a result of our experiments using simple samples, however, it has been found that the above-described method substantially serves the purpose.

Figure 4A:
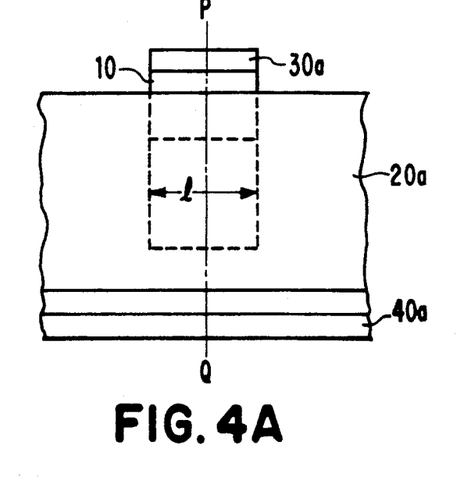
FIGS. 4(a), 4(b), 4(c), 4(d), 5(a), 5(b), 5(c), 5(d), 6(a), 6(b), 7(a), 7(b), 8(a), 8(b), 8(c), 8(d) are sectional views and side views illustrating embodiments of the present invention.
Figure 4B:
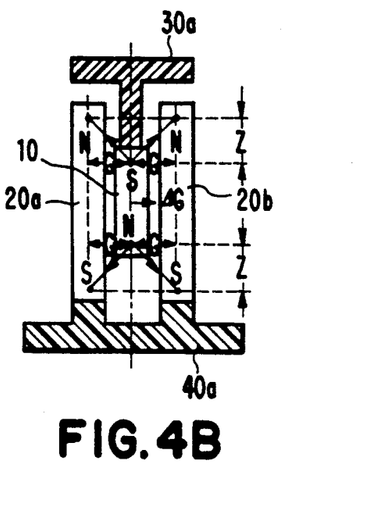
Figure 4C:
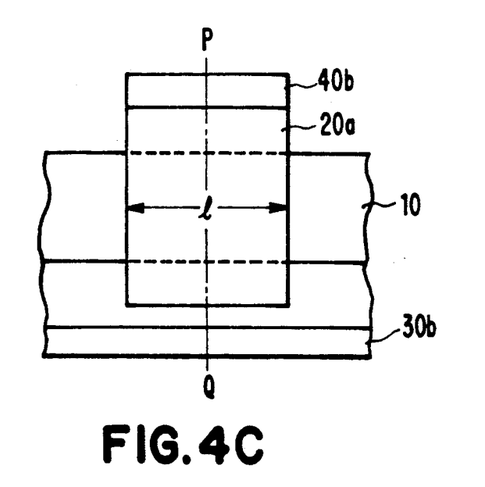
Figure 4D:
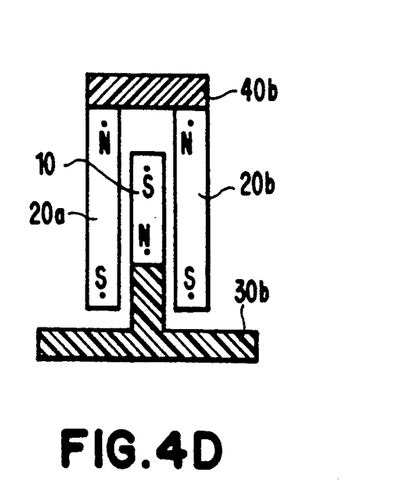

FIG. 4(a), 4(b) illustrates an embodiment in which the magnetic plates 20a and 20b constitute a guide and the magnetic plate 10 between them is a moving member. Reference numeral 30a indicates a non-magnetic moving member which is guided together with the moving member 10 and 40a a non-magnetic support which couples together and supports the magnetic plates 20a and 20b. FIG. 4(c), 4(d) illustrates an embodiment in which the central magnetic plate 10 serves as a guide and the magnetic plates 20a and 20b on both sides thereof serve as the moving member. Reference numeral 40b indicates a non-magnetic coupling member and 30b a non-magnetic support. In either case, the magnetic poles of the both side magnetic plates 20a and 20b are spaced by a greater distance apart from a horizontal plane passing through the centers of the magnetic plates 10, 20a and 20b than the magnetic pole of the magnetic plate 10. That is, the magnetic plates 20a and 20b are higher in the position of their magnetic poles than the central magnetic plate 10.

Figure 5A:
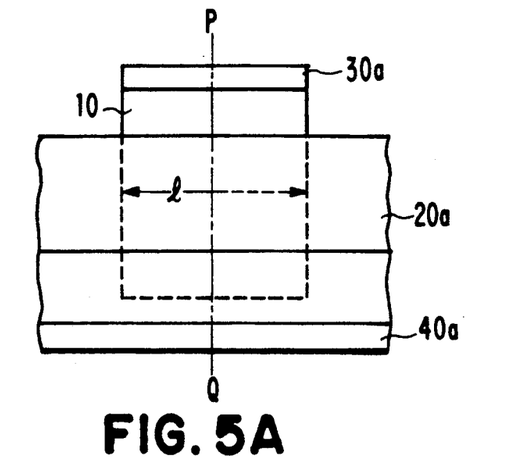
Figure 5B:
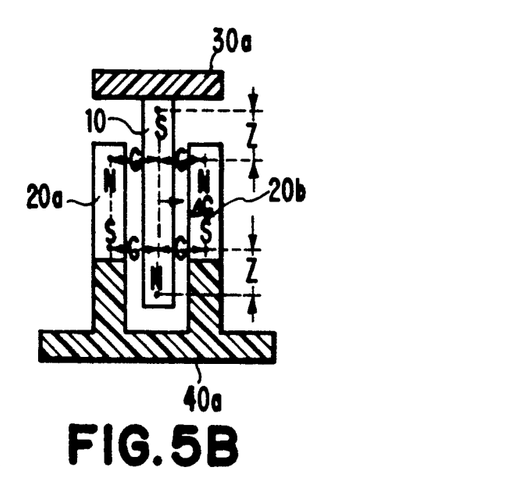
Figure 5C:
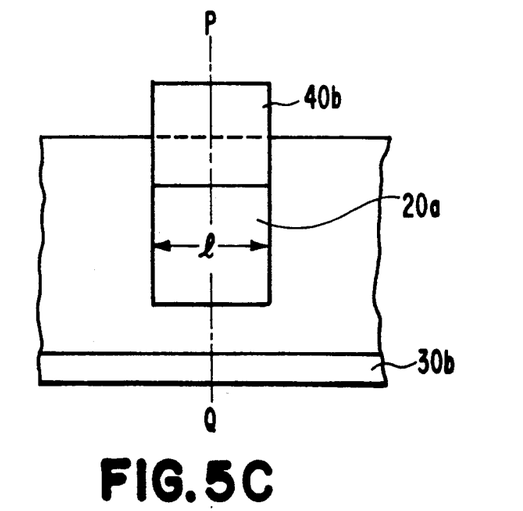
Figure 5D:
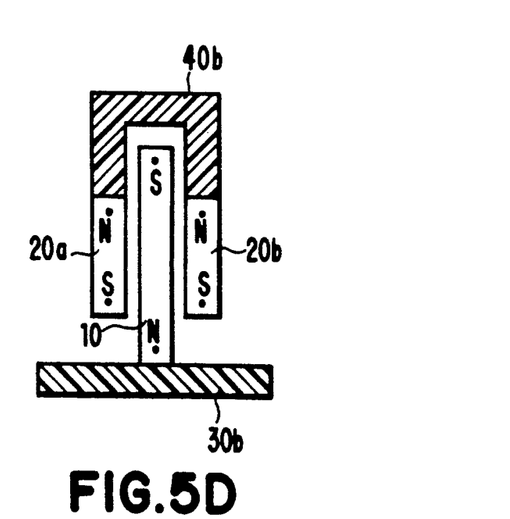

In FIG. 5(a), 5(b) the both side magnetic plates 20a and 20b constitute a guide, whereas in FIG. 5(b), 5(c), 5(d) the central magnetic plate 10 acts as the guide. In the both cases the central magnetic plate 10 has its magnetic pole higher in position than those of the magnetic plates 20a and 20b.

In FIGS. 4(a), 4(b), 4(c), 4(d) and FIGS. 5(a), 5(b), 5(c), 5(d), the left-hand figures are side views and the right-hand figures are sectional views taken on the lines P-Q.

Figure 6A:
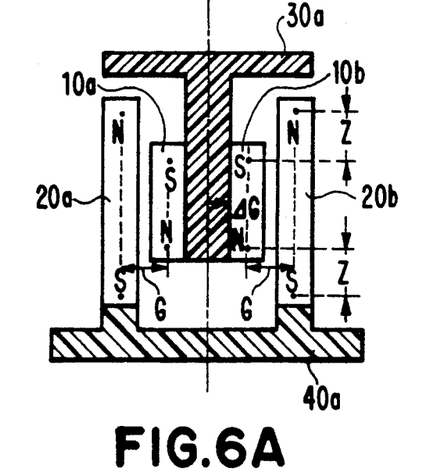
Figure 6B:
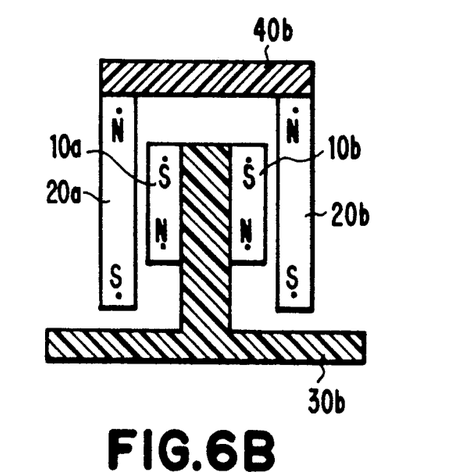
Figure 7A:
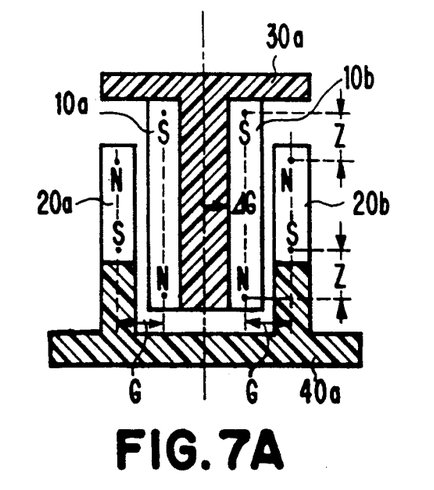
Figure 7B:
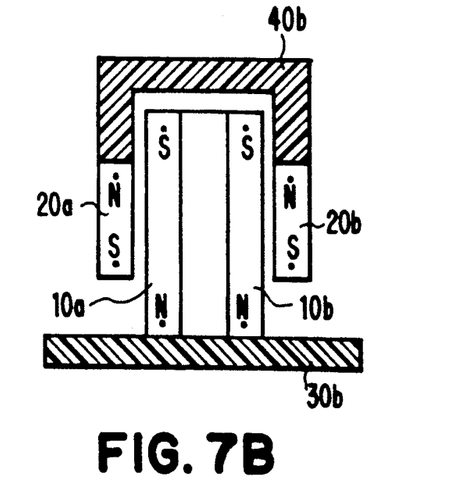

FIGS. 6 and 7 illustrate other embodiments of the invention in which the central magnetic member 10 is made up of two plate-shaped magnetic members 10a and 10b. In FIG. 6(a) the both side magnetic plates 20a and 20b serve as a guide, and in FIG. 6(b) the central magnetic plates 10a and 10b serve as a guide. In either case the magnetic poles of the magnetic plates 20a and 20b are higher in position than those of the magnetic plates 10a and 10b. In FIG. 7(a) the magnetic plates 20a and 20b serve as a guide, and in FIG. 7(b) the magnetic plates 10a and 10b serve as a guide. In either case the magnetic poles of the magnetic plates 10a and 10b are higher in position than those of the magnetic plates 20a and 20b.

Figure 8A:
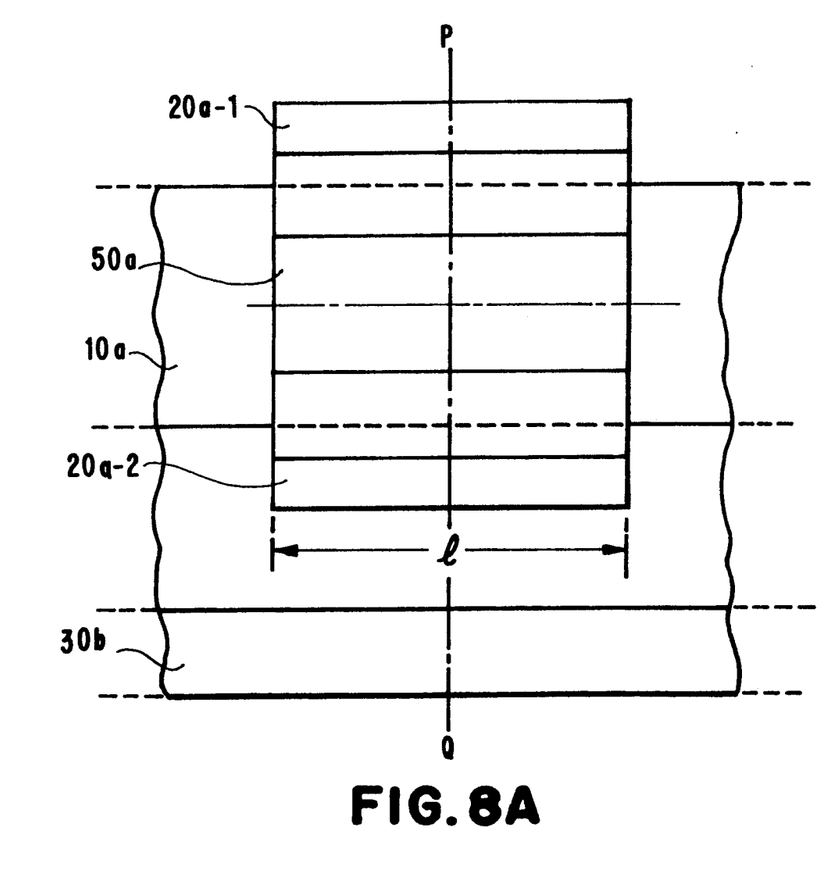
Figure 8B:
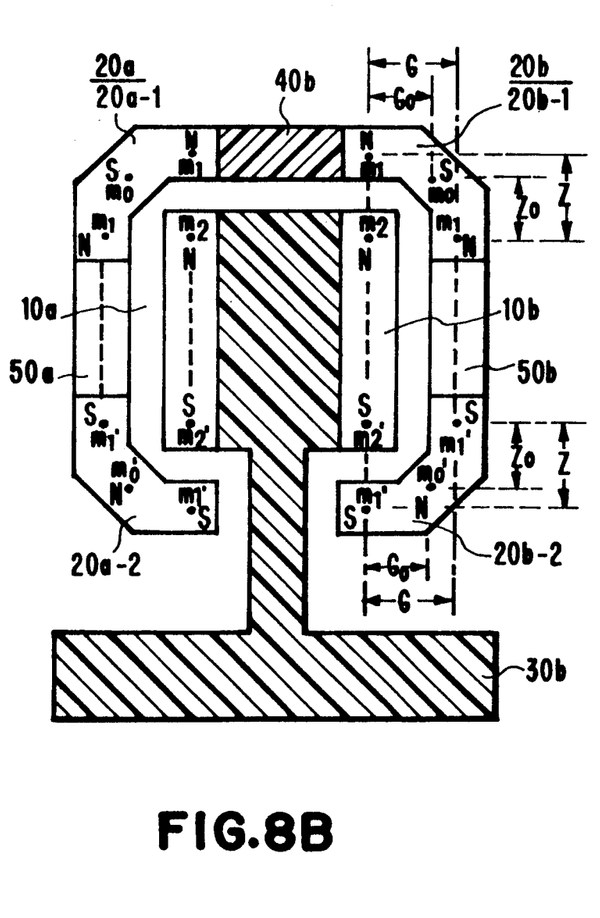
Figure 9:
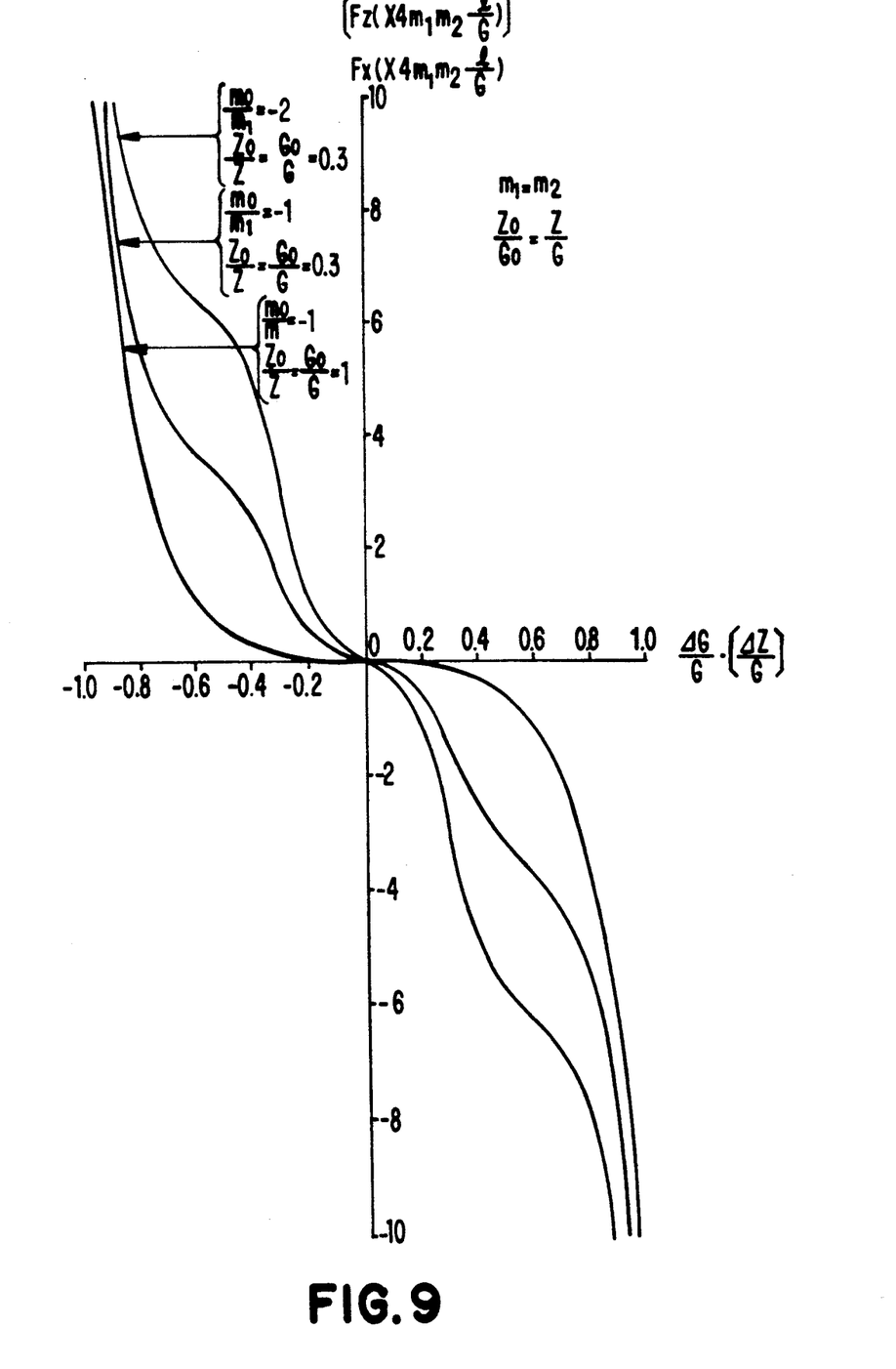
FIG. 9 is a graph showing the operation characteristics of the embodiment of FIGS. 8(a), 8(b).

FIG. 8(a), 8(b) illustrates another embodiment of the present invention in which the central magnetic member is made up of two magnetic plates 10a and 10b, each having magnetic charges $m_2$ and $m_2'$ at their upper and lower portions, and the both side magnetic plates 20a and 20b are composed of two inwardly bent magnetic members 20a-1, 20a-2 and 20b-1, 20b-2, respectively, the bent magnetic members 20a-1 and 20a-2 (or 20b-1 and 20b-2) being coupled together by a coupling member 50a (or 50b). This embodiment is constructed so that magnetic charges $m_1$, $m_0$, $m_1$ and $m_1'$, $m_0'$, $m_1'$ are provided in the bent magnetic members 20a-1, 20a-2 and 20b-1, 20b-2 in the vertical direction as shown and that the magnetic charges $m_1$ and $m_2$, $m_1'$ and $m_2'$ repel each other and the magnetic charges $m_2$ and $m_0$, $m_2'$ and $m_0'$ attract each other. Now, let distances between the magnetic charges $m_1$ and $m_2$ and between $m_1'$ and $m_2'$ in the vertical and horizontal directions be represented by Z and G, respectively, and distances between the magnetic charges $m_2$ and $m_0$ and between $m_2'$ and $m_0'$ in the vertical and horizontal directions by $Z_0$ and $G_0$, respectively. As shown in FIG. 9, the same curves are obtained with the forces $F_x$ and $F_z$ in the horizontal and vertical directions applied to the central magnetic plate for moving it by $\Delta G$ and $\Delta Z$ in those directions, the forces $F_x$ and $F_z$ being plotted against $\Delta G/G$ and $\Delta Z/G$, respectively.

The curves in FIG. 9 show the relationships of the forces $F_x$ and $F_z$ to $\Delta G/G$ and $\Delta Z/G$, respectively, for conditions $m_0/m_1 = -1$ and $Z_0/Z = G_0/G = 1$, conditions $m_0/m_1 = -1$ and $Z_0/Z = G_0/G = 0.3$ and conditions $m_0/m_1 = -2$ and $Z_0/Z = G_0/G = 0.3$ in a case where the magnetic charges $m_1$ and $m_2$ are equal and of the same polarity, $Z_0/G_0 = Z/G$ and $m_0/m_1 < 0$, i.e. the magnetic charges are of different polarities. In all cases, the zero point is a stable point and the forces $F_x$ and $F_z$ are both greater than in the afore-mentioned embodiment; namely, excellent characteristics can be obtained.

Figure 8C:
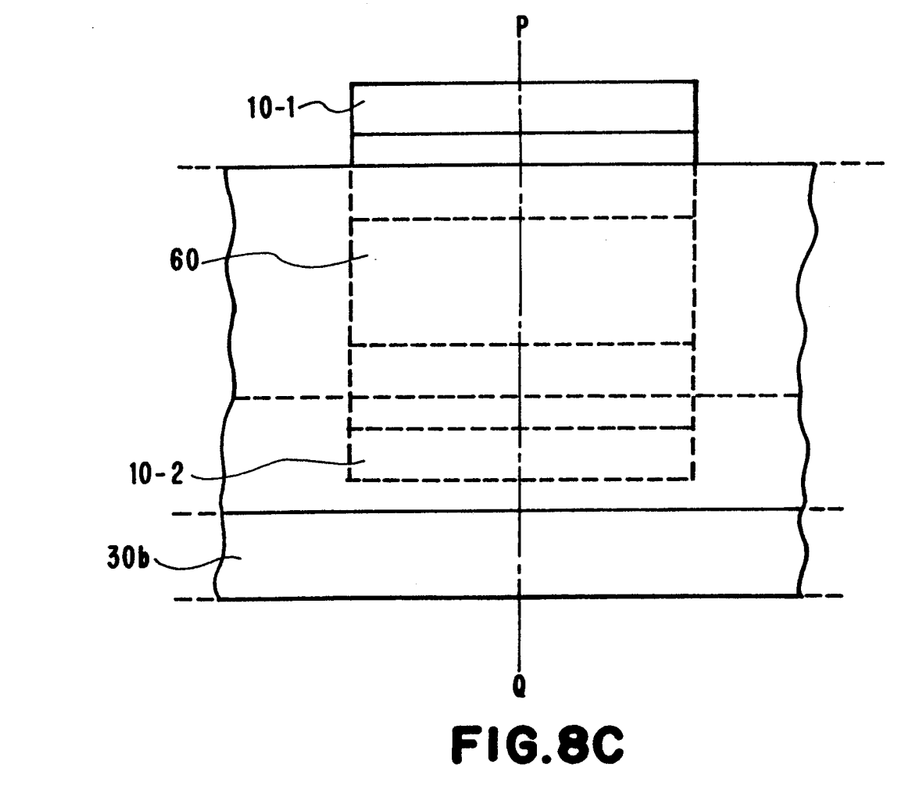
Figure 8D:
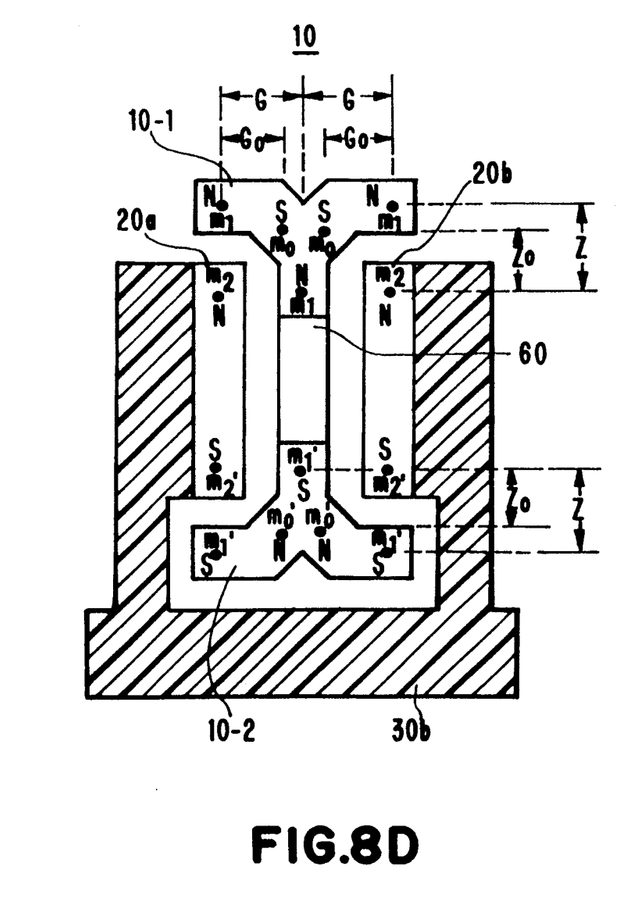

In FIG. 8(a), 8(b) the central magnetic plates 10a and 10b serve as a guide, whereas in FIG. 8(b), 8(c), 8(d) the outer magnetic plates 20a and 20b serve as a guide and the inner magnetic member 10 is composed of two top and bottom bent magnetic members 10-1 and 10-2 which are coupled together by a coupling member 60. In FIG. 8 the left-hand figure is a side view and the right-hand figure is a sectional view taken on the line P-Q.

While in the above the inner magnetic member 10 and the outer ones 20a and 20b are both shown to be platelike members rectangular in section, it is apparent that the same results as mentioned above would be obtainable when they are bar-shaped members square in section.

In the guide device of the present invention a suitable drive system can be adopted for a driver in the lengthwise direction. More specifically, in case of utilizing the principles of a voice coil motor, the magnetic member held in its floating state according to the present invention could be guided lengthwise thereof in a non-contact manner by coupling it to a voice coil of the voice coil motor.

It is also possible to employ an arrangement in which the floating magnetic member is driven by applying, to a conductor plate provided at one end thereof, a shifting magnetic field such as used in a wattmeter.

In any case, high-speed precise position control can be effected by combining the device of the present invention with a stopping device having a position sensor.

The guide need not always be straight but may also be gently curved.

As described above, according to the present invention, since the inner and outer magnetic members are formed so that magnetic poles are continuously arranged in a lengthwise thereof, a magnetic member in its floating state can be held extremely stably over the entire length thereof and, in addition, it can be driven and guided in its longitudinal direction smoothly at a high speed by a very small driving force. Besides, the floating magnetic member can be stopped at a desired position theoretically.

Hence, the present invention is of great utility when employed in mechanisms calling for precise position control as in CD (compact disk) players, floppy disk drives, video disk players, megnetooptic disk drives, X-Y plotters, etc.

I claim:

1. A non-contact-guidable magnetic floating device comprising:
   at least one inner magnetic member formed so that magnetic poles are continuously arranged lengthwise thereof;
   two outer magnetic members disposed on both sides of said inner magnetic member in adjacent but spaced relationship thereto so that magnetic poles, the polarity of each of which is opposite vertically to that of said inner magnetic member, are continuously arranged lengthwise thereof;
   a non-magnetic coupling member provided out of contact with said inner magnetic member, for coupling together said two outer magnetic members; and
   a support for supporting and fixing one of said inner and outer magnetic members;
   wherein the other of said inner and outer magnetic members is held in a floating state in which it has restoring forces to its center positions in vertical and horizontal directions, by magnetic attractive forces between said inner and outer magnetic members; and
   wherein said other magnetic member can be guided lengthwise thereof in said floating state.

2. A non-contact-guidable magnetic floating device according to claim 1, characterized in that it is constructed so that $Z/G \simeq 1$, where Z and G are differences in position in vertical and horizontal directions between the magnetic poles of said inner magnetic member and attracting ones of the magnetic poles of said outer magnetic members.

3. A non-contact-guidable magnetic floating device according to claim 1 or 2, characterized in that said inner magnetic member is made up of two magnetic members coupled together by a non-magnetic member and those magnetic poles of said two magnetic members corresponding to each other in the horizontal direction are of the same polarity.

4. A non-contact-guidable magnetic floating device comprising:

two inner magnetic members arranged horizontally in parallel coupled together and formed so that magnetic poles are the same polarity and continuously arranged lengthwise thereof;

a non-magnetic member coupling together said two inner magnetic members;

two outer magnetic members disposed on both sides of said inner magnetic members in adjacent but spaced relation thereto so that magnetic poles are continuously arranged lengthwise thereof; each of said two outer magnetic members being made of two top and bottom inwardly bent magnetic members coupled together by a coupling member, each of said inwardly bent magnetic members having at both end portions magnetic poles of the same polarity as the corresponding poles of said inner magnetic members, two inner magnetic poles of each of said inwardly bent magnetic members being disposed on a first straight line passing through two vertically aligned magnetic poles of each of said two inner magnetic members, and two outer magnetic poles of each of said inwardly bent magnetic members being disposed on a second straight line passing through those two of the magnetic poles of said two inner magnetic poles which face each other in the horizontal direction and perpendicularly intersecting said first straight line;

a non-magnetic coupling member provided out of contact with said inner magnetic member, for coupling together said two outer magnetic members; and a support for supporting and fixing said inner magnetic members;

whereby the outer magnetic members are effectively held in a floating state in which restoring forces are applied to center positions thereof in vertical and horizontal directions, by magnetic attractive forces between said inner and outer magnetic members; and said outer magnetic members can be guided lengthwise thereof in said floating state.

5. A non-contact-guidable magnetic floating device comprising:

two outer magnetic members disposed horizontally in parallel spaced relationship and formed so that magnetic poles thereof are continuously arranged lengthwise thereof; two inner magnetic members arranged spaced vertically and parallel horizontally and formed so that magnetic poles are continuously arranged lengthwise thereof, a non-magnetic member coupling said two inner magnetic members vertically spaced, said inner magnetic members being made respectively as inwardly and outwardly extending magnetic members, each of said inwardly and outwardly extending magnetic members have at end portions thereof magnetic poles of the same polarity as those of corresponding poles of said outer magnetic members, two outer magnetic poles of each of said outwardly extending magnetic members being each disposed on a respective straight line passing through two vertically aligned magnetic poles of a respective one of said two outer magnetic members, and respective inner magnetic poles of each of said inwardly extending magnetic members being disposed on a corresponding second straight line passing through respective two of the magnetic poles of said two outer magnetic members which face each other in a horizontal direction and perpendicularly intersecting said first straight line;

said two outer magnetic members being disposed on opposite sides of said nonmagnetic member coupling said two inner magnetic members in adjacent and spaced relation thereto, such that magnetic poles of said outer magnetic members have corresponding polarities; and a non-magnetic coupling member disposed out of contact with said inner magnetic members, four coupling together said two outer magnetic members and for supporting and fixing said outer magnetic members;

whereby the inner magnetic members are effectively held in a floating state in which restoring forces are applied to center positions thereof in vertical and horizontal directions, by magnetic attractive forces between said inner magnetic members and said outer magnetic members; and said outer magnetic members can be guided lengthwise thereof in said floating state.

* * * * *